April 22, 1969     D. L. McCALLUM     3,439,578

THREE-DIMENSIONAL MODELS

Filed Sept. 15, 1966

DAVID LIVINGSTON McCALLUM, M.R.P.
INVENTOR.

BY

ATTORNEY

United States Patent Office 3,439,578
Patented Apr. 22, 1969

3,439,578
THREE-DIMENSIONAL MODELS
David Livingston McCallum, 9258 Aero Drive,
Pico Rivera, Calif. 90660
Filed Sept. 15, 1966, Ser. No. 579,769
Int. Cl. B23c 1/16, 1/18
U.S. Cl. 90—13
2 Claims

ABSTRACT OF THE DISCLOSURE

An apparatus and method of optically relaying information from a pattern of contours for profiling three-dimensional objects to a viewing scope for manual operation or to a control box for automatic operation.

This invention relates to apparatus and method for sensing patterns used in machining three-dimensional articles from patterns. This invention can be used in connection with the invention disclosed in my copending application for Apparatus and Method for Making Three-Dimensional Articles, Ser. No. 426,480, filed Jan. 14, 1965, and now Patent No. 3,273,461.

While the invention has particular utility in connection with the making of three-dimensional relief or contoured terrain maps or models, and is shown and described in such connection it is to be understood that its utility is not confined thereto.

The production of suitable three-dimensional topographical models of contour maps and the like involve certain problems and difficulties and it is an object of the present invention to provide apparatus and method or process for solving such problems and overcoming said difficulties.

It is another object of the invention to provide apparatus with which a substantial reduction in the time required to produce maps and the like will be effected.

It is still another object of the invention to provide apparatus of this character which will make for greater accuracy in the production of such three-dimensional models.

A further object of the invention is to provide apparatus of this character whereby such models, maps and the like may be made with optimum uniformity.

Another object of the invention is to provide apparatus of this character that will make three-dimensional objects or articles from a planar pattern.

Still another object of this invention is to provide apparatus of this character that will carve a three-dimensional article or model from a large solid block of material.

A further object of this invention is to provide apparatus of this character wherein there is a fixed guide and a cutting tool in relation to said guide.

It is a still further object of the invention to provide apparatus of this character wherein the guide and cutting tool are in axial alignment with each other.

It is another object of the invention to provide apparatus of this character wherein the guide and cutting tool are fixed and the material worked upon is movable.

It is still another object of the invention to provide apparatus of this character wherein the block of material worked upon has a contour map or pattern located upon it in cooperable relationship with the guide indicator.

A further object of this invention is to provide apparatus of this character wherein the pattern may be sensed through a light transmitting mechanism.

A still further object of this invention is to provide apparatus of this character wherein the pattern is illuminated from one side and the illumination changes sensed on the other side.

Another object of this invention is to provide apparatus of this character wherein the illumination sensors are attached to and located about the guide.

A still further object of this invention is to provide apparatus of this character wherein the illuminator and the pattern are attached to one side of the material worked upon while the cutting is to be performed on the other side.

It is a still further object of the invention to provide apparatus of this character wherein there is simultaneous marking on a pattern in exact relationship to an area being cut or shaped.

Another object of this invention is to provide apparatus of this character wherein the illumination sensors sense from the pattern the area which is being cut on the cutting side.

It is another object of the invention to provide apparatus of this character means for carrying away the cuttings as the cutting operation is in progress.

It is still another object of the invention to provide apparatus of this character that is relatively simple in construction.

It is still another object of the invention to provide a method whereby the foregoing objects are carried out.

The characteristics and advantages of the invention are further sufficiently referred to in connection with the following detailed description of the accompanying drawings, which represent certain embodiments after considering these examples, skilled persons will understand that variations may be made without departing from the principes disclosed, and I contemplate the employment of any structures, arrangements, modes of operation, or steps that are properly within the scope of the appended claims.

Referring to the drawings, which are for illustrative purposes only:

Figure 1:
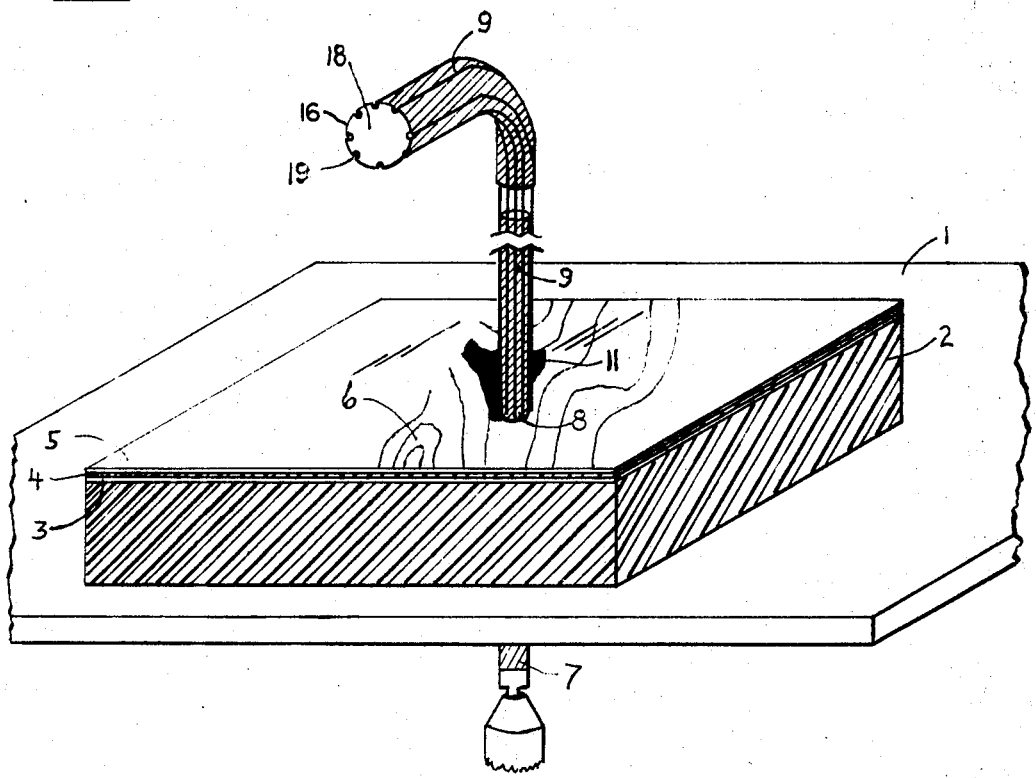
FIG. 1 is perspective sectional view of apparatus embodying the invention.
Figure 2:
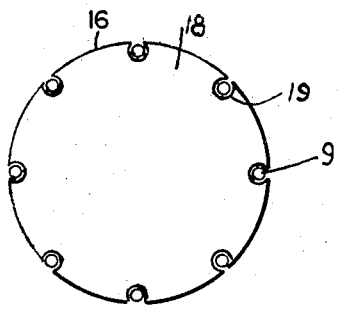
FIG. 2 is an enlarged sectional view showing the attachments to the marker.
Figure 3:
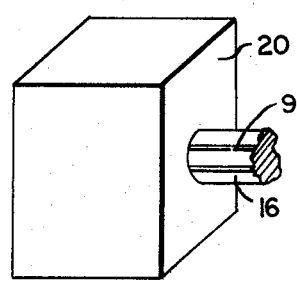
FIG. 3 is a perspective view showing viewing scope connected to the light-transmitting devices.

Referring to FIGS. 1 and 2 there is shown a section of the table 1 on which rests the workpiece 2 with a marker 8 on the upper side of the workpiece 2 axially aligned with a cutting tool 7 on operating on the underside of the workpiece 2 through a hole in the table 1.

An illuminating surface 3, in this case consisting of a flat illuminator with the trade name "Panelesceny" produced by Sylvania Company, is placed upon the whole upper part of the workpiece 2, so that light is projected vertically from the illuminating surface 3 from every point on the upper side of the workpiece 2. Upon the illuminating surface 3 is placed a transparentized pattern sheet 4 bearing a pattern of contours 6, said transparentized pattern sheet 4 being overlayed with a blank transparent overlay 5.

Around the marker 8 are located light-transmitting devices 9 of fine diameter, in this case optic fibers, which are gathered as at 10 and lead to a viewing scope 16 which is located in a position convenient to the operator of the cutting apparatus, said viewing scope 16 comprises a rod 18 with grooves 19 within which are held the viewing ends of the light-transmitting devices 9 in the identical respective positional array in which the light-transmitting devices 9 are positioned about the marker 8.

Said light-sensing devices 9 are set slightly above the surface of the transparent overlay 5 so as not to come in contact with the marks 11 made by the marker 8 where the cutting tool 7 has already cut.

In operation, the operator observes the viewing scope 16 in order to control the direction of lateral movement of the workpiece 2 over the surface of the table 1.

The light-transmitting devices 9 transmit the presence of light emanating from the illumination source 3 between the contour lines 6 or the transparentized pattern 4 and relay this information to the operator at the viewing scope 16. The operator moves the workpiece 2 in the opposite directions from those indicated in the viewing scope 16 by the light transmitting sensed by the devices 9 so that the cutting tool 7 and marker 8 respectively engage the workpiece 2 and transparent overlay 5 in the direction in which the light from the illuminating source 3 is passed through the transparentized pattern sheet.

The contours 6 of the transparentized pattern sheet 4 block the light of the illuminating source 3 from reaching the light-transmitting devices 9, when said light-transmitting devices 9 are in positions directly over the contours 6. This information is transmitted to the viewing scope 16 whereby the operator then prevents movement of the workpiece 2 in a direction which would cause the cutting tool 7 to carve the workpiece 2 beyond the contour. Thus the action of the cutting tool 7 is confined, to the vertical projection of the area between two contours 6 on the transparentized pattern sheet 4. As the workpiece is so moved as to have a contour level carved the marker 8 deposits an opaque substance 11 on the surface of the transparent overlay in exact correspondence with the area being cut. The opaque substance 11 also blocks light of the illuminating source 3 from reaching the light-transmitting devices 9 when said light-transmitting devices 9 are in positions directly over the opaque substance 11. This information is transmitted to the viewing scope 16, through the light-transmitting devices 9, indicating to the operator that the workpiece 2 should not be moved in a direction to have that direction cut. The workpiece 2 is thus prevented from being moved to cause cutting of areas which have already been cut.

The invention and its attendant advantages will be understood from the foregoing and it will be apparent that various changes may be made in the process or method and the form, construction and arrangement of the parts of the apparatus of the invention without departing from the spirit and scope thereof or sacrificing all of its material advantages, the arrangements hereinbefore described being merely by way of example.

I claim:
1. An apparatus for making three-dimensional profiled articles, comprising:
   (A) an illuminating source placed upon the workpiece to be profiled;
   (B) a transparentized pattern permitting light to pass through the pattern;
   (C) a marker which deposits an opaque substance above the pattern where the area has already been cut;
   (D) light-transmitting devices located about the marker to relay information to a viewing scope to indicate the direction in which cutting should proceed.

2. A method of forming a three-dimensional profiled article comprising the steps of:
   (A) illuminating a transparentized pattern;
   (B) sensing the said illumination as modified by the passage through said pattern, through light conveying devices; and
   (C) cutting the workpiece in correspondence with said pattern through which illumination is sensed.

References Cited
UNITED STATES PATENTS

| | | | |
|---|---|---|---|
| 2,359,032 | 9/1944 | Gott | 89—41 |
| 3,105,907 | 10/1963 | Colten et al. | 250—202 |
| 3,224,339 | 12/1965 | Nusbaum et al. | 90—13.1 |

GERALD A. DOST, *Primary Examiner.*

U.S. Cl. X.R.

33—1